June 12, 1923.
R. REYNOLDS
1,458,438
AUXILIARY VALVE FOR INFLATING VALVE TUBES
Filed Oct. 26, 1921
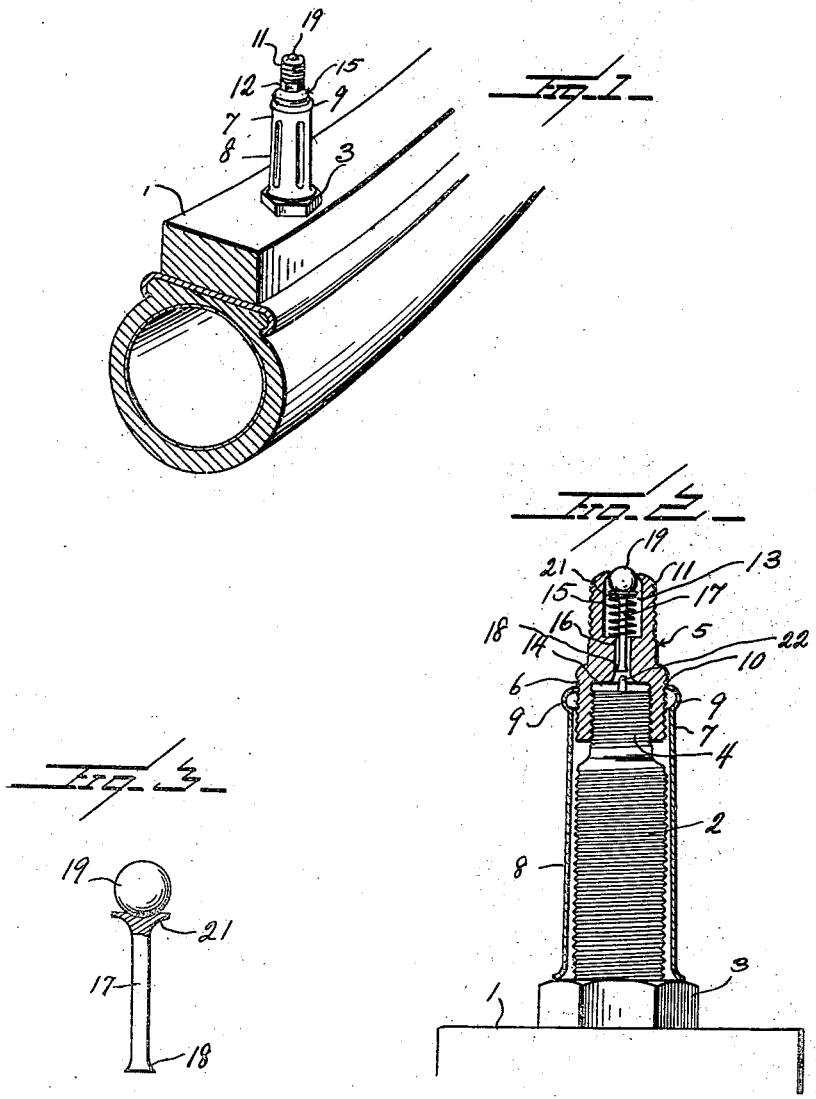
Inventor
R. Reynolds
By Watson E. Coleman
Attorney Patented June 12, 1923.

1,458,438

UNITED STATES PATENT OFFICE.

ROHDE REYNOLDS, OF HOUSTON, TEXAS.

AUXILIARY VALVE FOR INFLATING VALVE TUBES.

Application filed October 26, 1921. Serial No. 510,557.

*To all whom it may concern:*

Be it known that I, ROHDE REYNOLDS, a citizen of the United States, residing at Houston, in the county of Harris and State of Texas, have invented certain new and useful Improvements in Auxiliary Valves for Inflating Valve Tubes, of which the following is a specification, reference being had to the accompanying drawings.

As a rule considerable time is consumed in screwing and unscrewing dust caps upon inflating valve tubes of wheels, and in order to obviate this the present invention aims to provide an auxiliary valve for the inflating valve tube, to keep out the dust and the like and to obviate the necessity of connecting and disconnecting a dust cap. By the provision of an auxiliary valve of this kind for inflating valve tubes, permits an operator to slide the finger over the top of the auxiliary valve to remove the accumulated dust, so that an air hose can be subsequently connected, which can be accomplished in a very few minutes.

Another purpose involves the provision of an auxiliary valve casing threaded upon an extension of the inflating valve tube, and to which one end of a dust cap may be threaded. The dust cap in this instance can be adjusted a sufficient distance, to cause it to fit tight against the lock or jam nut at the base of the inflating valve tube, in order to insure holding the parts in their proper position.

Another advantage in threading the dust cap to the auxiliary valve casing is that the dust cap can be applied to inflating valve tubes of different lengths, or to tubes which extend beyond the felly of the wheel different distances, thereby enabling the dust cap and the auxiliary valve casing to be applied to inflating valve tubes of different proportions. Also by threading the dust cap to the auxiliary valve casing, also permits the dust cap to be applied very quickly, in fact more quickly than the screwing on or off of the usual dust cap, where no auxiliary valve is used, or when screwing on or off a dust cap which is threaded to the inflating valve tube near the base.

Still another purpose is the provision of an auxiliary valve on the inflating valve tube, which is air tight, when closed, in order to prevent the loss or the escape of air from the tire should the main valve give away.

A further purpose is the provision of a dust cap to assist in holding the auxiliary valve casing in place, it being unnecessary to screw the dust cap onto the inflating valve tube the full length, in fact pivotal connections between the dust cap and valve stem proper are eliminated.

Still a further purpose is the provision of an auxiliary valve for inflating valve tubes, which is simple, efficient and practical, and capable of performing the work for which it is intended, and one that can be cheaply manufactured, and one wherein the dust cap is threaded to the auxiliary valve casing, in such wise as to insure a water tight joint, to keep the water from finding its way to and through the main valve of the inflating valve tube.

Additionally the invention aims to provide an auxiliary valve for the purpose indicated, adapted to be depressed by the inflow of air from the service hose, and adapted to in turn actuate the main valve, to permit the air under pressure to enter the tire.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in perspective of a portion of a felly, showing the tire thereon, and illustrating the improved auxiliary valve as applied to the main inflating valve tube;

Figure 2 is a sectional view through the dust cap and through the auxiliary valve for the inflating valve tube, thereby illustrating the improved features of construction;

Figure 3 is a detail view of the auxiliary valve, and its supporting stem removed from the auxiliary valve casing.

Referring to the drawings, 1 designates a conventional form of felly of a wheel, and 2 denotes the inflating valve tube, which is designed to pass through the felly, and threaded upon the inflating valve tube is a lock or jam nut 3, for the purpose of holding and locking the inflating valve tube in position. It will be noted that one end of said inflating valve tube has a reduced threaded part 4, to which an auxiliary valve casing 5 is threaded. The exterior of the base of the auxiliary valve casing is threaded as shown at 6, and furthermore the diameter of the base of the auxiliary valve casing is the same diameter as that of the inflating valve tube 2, so that the open end 7 of the dust cap 8 may pass over and be threaded to the auxiliary valve casing. The end 7 of the dust cap 8 is rounded or bulged as shown at 9, to permit the metal or the wall surrounding the opening 10 to yield, so as to insure a tight fit of the wall of the opening with the exterior threaded surface of the inflating valve casing. The inflating valve casing has a reduced extension 11, which is of the same diameter as that of the extension 4 of the inflating valve tube, in order that the service air supply hose may be easily and quickly attached to the auxiliary valve casing.

At the base of the extension 11, where it unites with the enlarged base of the auxiliary valve casing, a hexagon shaped shoulder 12 is formed, with which a wrench or the like may engage, for turning the auxiliary valve casing home and the extension 4.

The auxiliary valve chamber has its upper and lower parts chambered out, to provide the spaces or compartments 13 and 14, the former of which receives a coil expansion spring 15, while the latter is interiorly threaded to engage the threads of the extension 4. These spaces or compartments 13 and 14 are connected by the contracted neck or passage 16, which receives a stem 17. In fact the stem is smaller in diameter than the passage 16, so as to permit air under pressure to pass through the neck. In fact the lower end of the stem is enlarged as shown at 18, and it partly engages into the neck or passage, thereby acting to hold the stem in position, when the auxiliary valve is closed. One end of the neck or passage, where the enlargement or head 16 engages tapers or diverges, so that when the stem 17 is moved toward the main valve, the enlargement or head 18 will readily disengage the wall of the diverged or tapered end of said passage or neck, allowing the air under pressure to enter the inflating valve tube, and then into the tire.

An auxiliary spherical ball valve 19 is arranged in the chamber 13 adjacent the inlet end. In fact the inlet end of the auxiliary valve casing is open, and at the time of manufacturing the present device, the ball or spherical valve is first inserted, also the expansion spring and the stem, arranged as clearly shown in Figure 2. The inlet open end of the extension 11 of the auxiliary valve casing is sufficiently swaged or hammered, so as to sufficiently upset the metal surrounding the inlet end of the auxiliary valve casing, in such wise as to provide a valve seat on the interior of the space or chamber 13, and against which the auxiliary spherical valve engages.

The exterior surface of the extension 11 beyond the hexagon shaped shoulder, is threaded, to permit the connection of a service hose, whereby air under pressure may be forced into and through the auxiliary valve casing and the main casing, and through the inflating valve tube into the tire. The base of the dust cap 8 adjacent the lock or jam nut 3 is flared outwardly, so as to partly overlie the lock or jam nut 3. During the operation, a service hose may be applied to the extension 11, in which case the auxiliary valve will be disengaged from its seat, due to the pressure of air thereon, and since the stem 17 has one end flared or tapered as shown at 21 (on which the auxiliary valve 19 rests), the stem will move in a direction of the inflating valve tube, sufficiently to permit the head or enlargement 18 to contact with the stem 22 of the main valve (not shown), thereby permitting the main valve to become unseated to permit the air to enter the inflating valve tube and thence into the tire to be inflated.

Since the dust cap 8 is threaded to the base of the auxiliary valve casing, it is possible to connect the dust cap 8 very quickly. Threading the dust cap to the auxiliary valve casing, enables the dust cap to be applied very much easier and quicker than when applying the usual form of dust cap now in use, since the former dust cap had to be threaded the full length of the inflating valve tube. Furthermore a dust cap such as 8 can be applied to inflating valve tubes of different lengths, and also to stems which extend beyond the felly different distances. The auxiliary valve 19 is designed to have an air tight fit with its seat, especially due to the pressure of the springs of the auxiliary valve casing, thereby preventing the escape of air, especially should the main valve (not shown) give way, or otherwise incapable of performing its work.

The main principle of the stem 17, is to permit it to engage with the end of the stem 22, as shown in Figure 2, so that when applying an air gage to the extension 11, for the purpose of gaging the air pressure, the valve (not shown) of the stem 22, will readily open. Otherwise there will be no way of testing the air. However, this stem will act in the same way under a low pressure of air, which has already been fully explained. When air is being forced into the inflating valve tube, the air acts upon the spherical valve 19, which depresses the stem 17, and causes the valve (not shown) on the end of the stem 22 to open.

The invention having been set forth, what is claimed as being useful is:—

In an auxiliary valve for inflating valve tubes, the latter having a reduced extension, an auxiliary valve casing threaded to said extension and having its base the same diameter as the major base portion of the inflating valve tube, said auxiliary valve casing provided with an auxiliary valve adapted to operatively connect with and open the main valve of the inflating valve tube, a dust cap of larger diameter than and fitting over the inflating valve tube and having one end thereof flared outwardly and being engaged with the usual jam nut at the base of the inflating valve tube, the other end of the dust cap terminating in an inwardly rolled flange semi-circular in cross section, the diameter of the marginal edge of which being equal to and adjustably threaded upon the base of the auxiliary valve casing, the marginal edge of said flange extending inwardly beyond the inner cylindrical surface of the body of the dust cap, thereby holding the dust cap spaced from the inflating valve tube throughout its length, whereby the dust cap may be detached simultaneously with the auxiliary valve casing.

In testimony whereof I hereunto affix my signature.

ROHDE REYNOLDS.